United States Patent
On

(10) Patent No.: US 11,676,566 B2
(45) Date of Patent: Jun. 13, 2023

(54) METHOD FOR PRODUCING A MUSICAL INSTRUMENT AND MUSICAL INSTRUMENT OBTAINED THEREBY

(71) Applicant: SOPHIE LA GIRAFE, Rumilly (FR)

(72) Inventor: Bao Han On, Rumilly (FR)

(73) Assignee: SOPHIE LA GIRAFE, Rumilly (FR)

( * ) Notice: Subject to any disclaimer, the term of this patent is extended or adjusted under 35 U.S.C. 154(b) by 471 days.

(21) Appl. No.: 16/763,093

(22) PCT Filed: Dec. 3, 2018

(86) PCT No.: PCT/EP2018/083371
§ 371 (c)(1),
(2) Date: May 11, 2020

(87) PCT Pub. No.: WO2019/110520
PCT Pub. Date: Jun. 13, 2019

(65) Prior Publication Data
US 2020/0365130 A1  Nov. 19, 2020

(30) Foreign Application Priority Data
Dec. 4, 2017  (FR) ...................................... 1761581

(51) Int. Cl.
*G10K 5/00*  (2006.01)
*A01K 15/02*  (2006.01)
*A63H 5/00*  (2006.01)

(52) U.S. Cl.
CPC .............. *G10K 5/00* (2013.01); *A01K 15/025* (2013.01); *A63H 5/00* (2013.01)

(58) Field of Classification Search
CPC ........ G10K 5/00; G10K 15/04; A01K 15/025; A63H 5/00
See application file for complete search history.

(56) References Cited

U.S. PATENT DOCUMENTS

| | | | | |
|---|---|---|---|---|
| 1,461,193 A | * | 7/1923 | Larsen | A63H 3/06 446/224 |
| 2,712,201 A | * | 7/1955 | Wintriss | A63H 5/00 285/200 |

(Continued)

FOREIGN PATENT DOCUMENTS

| | | |
|---|---|---|
| EP | 2446737 A2 | 5/2012 |
| EP | 2446738 A2 | 5/2012 |

(Continued)

OTHER PUBLICATIONS

International Search Report issued in PCT Patent Application No. PCT/EP2018/083371 dated Mar. 6, 2019.

*Primary Examiner* — John Fitzgerald
*Assistant Examiner* — Tania Courson
(74) *Attorney, Agent, or Firm* — Marshall, Gerstein & Borun LLP

(57) ABSTRACT

A musical instrument includes a hollow and compressible body made of a flexible and elastic material, delimiting an internal cavity divided into two chambers by an internal wall through which a musical insert is mounted. The body is closed in a sealed manner such that the two chambers are hermetic and communicate only via the musical insert. Said musical insert is designed to emit a sound when passed through by an air flow generated by a mechanical pressure exerted on said body at the level of one of the chambers, which pushes some of the air volume from this chamber into the other chamber through said musical insert. Thus, this musical instrument is said to be "clean" because it does not need to communicate with the external environment in order to generate a sound, and is perfectly safe.

11 Claims, 2 Drawing Sheets

(56) References Cited

U.S. PATENT DOCUMENTS

| | | | | |
|---|---|---|---|---|
| 2,817,116 | A * | 12/1957 | Miller | B29C 41/383 |
| | | | | 249/142 |
| 4,380,134 | A * | 4/1983 | Taluba | B29C 49/54 |
| | | | | 446/188 |
| 6,935,274 | B1 * | 8/2005 | Rothschild | A01K 15/025 |
| | | | | 119/702 |
| 7,066,779 | B2 * | 6/2006 | Willinger | A63H 3/28 |
| | | | | 119/707 |
| 7,264,533 | B2 * | 9/2007 | Chan | A63H 3/06 |
| | | | | 446/183 |
| 7,833,079 | B2 * | 11/2010 | Willinger | A63H 5/00 |
| | | | | 119/707 |
| 10,681,899 | B1 * | 6/2020 | Rutherford | A63H 5/00 |
| 2012/0067294 | A1 | 3/2012 | Curry et al. | |
| 2012/0270467 | A1 | 10/2012 | Rutherford et al. | |
| 2014/0109841 | A1 * | 4/2014 | Vap | A01K 15/025 |
| | | | | 119/707 |
| 2016/0236107 | A1 * | 8/2016 | Irie | A63H 3/31 |

FOREIGN PATENT DOCUMENTS

| | | | | |
|---|---|---|---|---|
| FR | 587841 | A | 4/1925 | |
| FR | 2793152 | A1 | 11/2000 | |
| FR | 3071171 | A1 * | 3/2019 | A01K 15/025 |
| GB | 511261 | A * | 8/1939 | |
| WO | WO-2012/158742 | A1 | 11/2012 | |
| WO | WO-2017/045166 | A1 | 3/2017 | |
| WO | WO-2019052885 | A1 * | 3/2019 | A01K 15/025 |

* cited by examiner

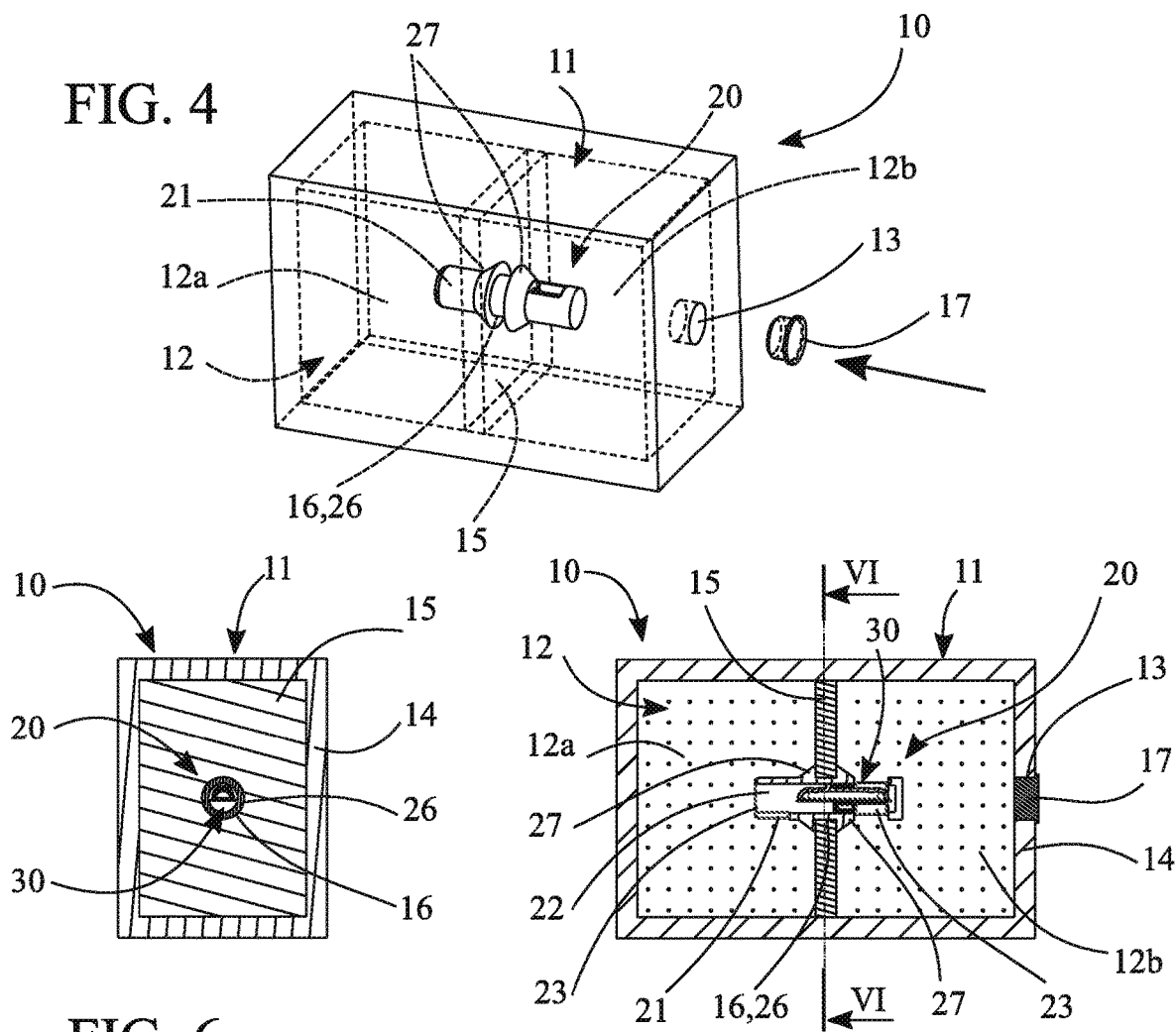
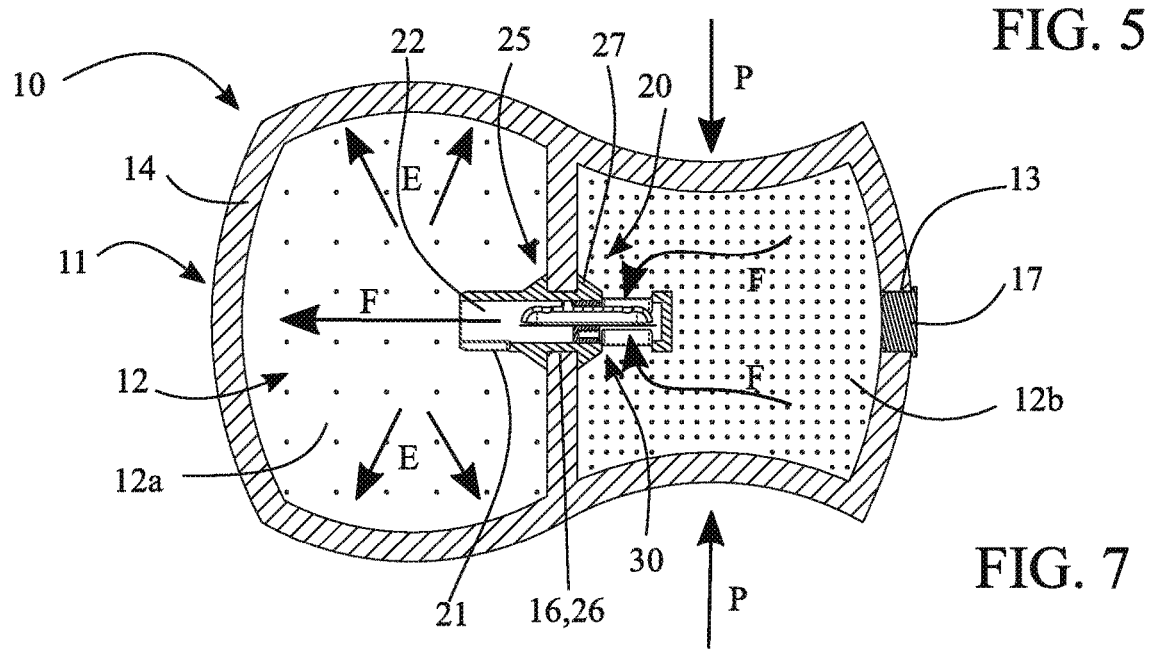

METHOD FOR PRODUCING A MUSICAL INSTRUMENT AND MUSICAL INSTRUMENT OBTAINED THEREBY

TECHNICAL FIELD

The present invention relates to a method for producing a musical instrument, said musical instrument comprising a hollow and compressible body made of a flexible and elastic material, delimiting an internal cavity, an internal wall arranged inside said body in order to divide said internal cavity into two chambers, and a musical insert mounted through said internal wall in order to place said chambers in communication with one another and designed to emit a sound when passed through by an air flow, said air flow being generated by a mechanical pressure exerted on said body at the lever of one of the chambers, in which method the body of said musical instrument is made, using a moulding technique, from an elastomer material shaped in a hollow production mould provided with a vent, the internal volume of said mould corresponding to the three-dimensional impression of said body.

The invention further relates to a musical instrument obtained according to the aforementioned production method.

BACKGROUND

The musical instruments to which the invention applies include, in a non-limiting manner, small wind instruments such as whistles used for music, games, emergency situations, signalling, alarms, as well as child and infant toys, animal toys, and any other squeaking or whistling instrument, which has the distinctive feature of emitting a sound when compressed and/or when nibbled. These instruments are conventionally produced by moulding from an elastic material, such as a natural or synthetic rubber, or any other technically equivalent material, i.e. that has elastic properties that allow the instrument to recover its initial shape after removing the compressive stress. Moreover, and depending on the intended purpose of the instrument, the material used must meet strict non-toxicity sanitary standards, in particular when in contact with a child's saliva. In such a case, natural materials such as latex are preferred, however this example is not limiting.

The musical insert generally comprises a small wind instrument having a labium, a vibrating reed or a combination thereof, designed to emit a sound by restriction or vibration during the passage of a pressurised air flow caused either by the breath of the mouth or by the air driven from the internal volume of the instrument outwards when the body of the toy is compressed by a mechanical pressure.

The musical insert further comprises a music duct, which can be made by injection in an identical or similar material to that of said instrument, enabling the musical insert to be both positioned and to operate inside the instrument. In general, the musical insert contained in these instruments is added after the manufacture of said instrument during a manual reworking step and is inserted through a vent hole formed in a wall of the body of the instrument during the moulding step. Thus, the musical insert is mounted within this vent hole such that it communicates, on the one hand, with the internal volume of said instrument and, on the other hand, with the environment external to said instrument in order to create a gaseous exchange between these two environments when the user exerts a pressure on the body of said instrument to compress same and releases the pressure on said body so that the instrument recovers its initial shape. Every time said instrument is stressed, the musical insert emits a sound upon the passage of the air flow in an outwards direction from the inside of the instrument when the instrument is subjected to a compressive stress and/or in the opposite, inwards direction from the outside of the instrument when the stress placed on said instrument is released.

Operation of these musical instruments in all cases involves a risk of contaminating said instrument, and thus the user of said instrument, by external contaminants potentially originating either from the user or from the external environment. As a result, the musical instrument is almost impossible to clean and disinfect properly to prevent any cross-contamination.

Publications FR 2 793 152 A1, WO 2012/158742 A1 and WO 2017/045166 A1 respectively describe a whistle that can be used without the mouth, a whistle integrated into a toy, and a waterproof whistle, each requiring an orifice that opens out into the external environment.

Publications EP 2 446 737 A2 and EP 2 446 738 A2 describe an animal toy comprising, inter alia, a squeaking element that also communicates with the external environment via an orifice, but which is designed such that the animal cannot access and deteriorate same.

Finally, publication US 2012/270467 A1 proposes a musical toy designed to ensure child safety, wherein the musical element is mounted in a support, which is made integral with the body by bonding in an orifice formed in the body of the toy. One of the alternative embodiments diagrammatically shown is particularly safe since it prevents accidental access to the musical element. It comprises a closed body, inside which a musical element is mounted on an internal wall, which separates the internal chamber into two cavities, and enables a sound to be created by stressing the body at the level of one of the cavities. Thus, this solution could prevent the aforementioned contamination risks, however the industrial production thereof is not disclosed.

There is thus no current solution that can be implemented on an industrial scale for preventing the aforementioned contamination risk, while meeting child safety requirements.

SUMMARY OF THE DISCLOSURE

The present invention aims to overcome these drawbacks by proposing a so-called "clean" musical instrument that prevents any risk of contamination to said instrument from external contaminants that could originate either from the user or from the ambient air and thus any cross-contamination risk when said musical instrument is exchanged between a plurality of users, simplifying the cleaning and disinfection of said instrument by allowing cleaning by immersion or by simple contact with a cleaning solution, and substantially simplifying the industrial method for the production of said instrument.

For this purpose, the invention relates to a production method of the type specified in the preamble, characterised in that said internal wall provided with a through-orifice designed to receive and hold said musical insert in position is produced separately, in that, prior to the step of moulding said body, said internal wall is added into said production mould such that the periphery thereof is overmoulded by said body during the moulding step, in that, after the moulding operation for said body, said musical insert is inserted into said body via the vent hole left in the external wall of said body by the vent of said production mould, in order to interlock same in the internal wall through said through-orifice and simultaneously hermetically seal said through-orifice, and in that, after mounting the musical insert inside said body, said vent hole is closed by a plug in order to sealingly plug and hermetically seal said internal cavity, such that said musical insert is arranged inside said body, between the two chambers so as to communicate solely therewith, without any communication with the environment external to said musical instrument.

Preferentially, said internal cavity is filled with a determined and constant total air volume taking into account the elasticity of said material forming said body and the three-dimensional shape of said body in order to allow air to be displaced between the two chambers when a mechanical pressure is exerted on said body at the level of one of the chambers and thus allow a sound to be created each time said instrument is mechanically stressed.

In one preferred embodiment of the invention, the moulding technique used is a rotational moulding technique.

Preferentially, the internal wall and the body of said musical instrument are made of a similar, identical or compatible elastomer material, allowing the two materials to fuse during the moulding operation, which elastomer material can be chosen from natural rubbers, synthetic rubbers and thermoplastic elastomers.

Advantageously, a mounting area complementary to the through-orifice provided in said internal wall is provided on said musical insert and designed to hermetically seal said through-orifice. Said mounting area can in particular be produced in the form of a groove designed to receive said through-orifice, and two lips arranged on either side of said groove, designed to be pressed against the opposite faces of said internal wall, to hold said musical insert in the mounting position relative to said internal wall and to hermetically seal said through-orifice.

Additionally for this purpose, the invention relates to a musical instrument of the type specified in the preamble, characterised in that the periphery of said internal wall is overmoulded by said body and said internal wall comprises a through-orifice designed to receive and hold said musical insert in position, in that said musical insert is designed to hermetically seal said through-orifice, and in that said body comprises a vent hole that is hermetically sealed by a plug such that said musical insert is arranged inside said body, between the two chambers so as to communicate solely therewith, without any communication with the environment external to said musical instrument.

In one advantageous embodiment of the invention, said internal cavity is filled with a determined and constant total air volume taking into account the elasticity of said material forming said body and the three-dimensional shape of said body in order to allow air to be displaced between the two chambers when a mechanical pressure is exerted on said body at the level of one of the chambers and thus allow a sound to be created each time said instrument is mechanically stressed.

In the preferred embodiment of the invention, said musical insert comprises a mounting area complementary to the through-orifice provided in said internal wall and designed to hermetically seal said orifice.

Said mounting area can comprise a groove designed to receive said through-orifice, and two lips arranged on either side of said groove, and designed to be pressed against the opposite faces of said internal wall, to hold said musical insert in the mounting position relative to said internal wall and to hermetically seal said through-orifice.

BRIEF DESCRIPTION OF DRAWINGS

The present invention and the advantages thereof will appear more clearly in the following description of one embodiment given for purposes of illustration only and not intended to limit the scope of the invention, with reference to the accompanying drawings, wherein:

FIG. 4 is an exploded view of the instrument in FIG. 2 in a third production step, showing the mounting of a plug for sealingly closing the body of said instrument, FIG. 5 is an axial sectional view of the musical instrument according to the invention obtained after production, showing the plug assembled with the body of said instrument and the air volume contained inside said body, FIG. 6 is a cross-sectional view along the axis VI-VI through the separating wall of the musical instrument in FIG. 5, and FIG. 7 is a similar view to that in FIG. 5 showing said musical instrument in operation, whereby a part of the body of said musical instrument is compressed and under negative pressure, and the other part is expanded and under positive pressure.

DETAILED DESCRIPTION

Figure 1:
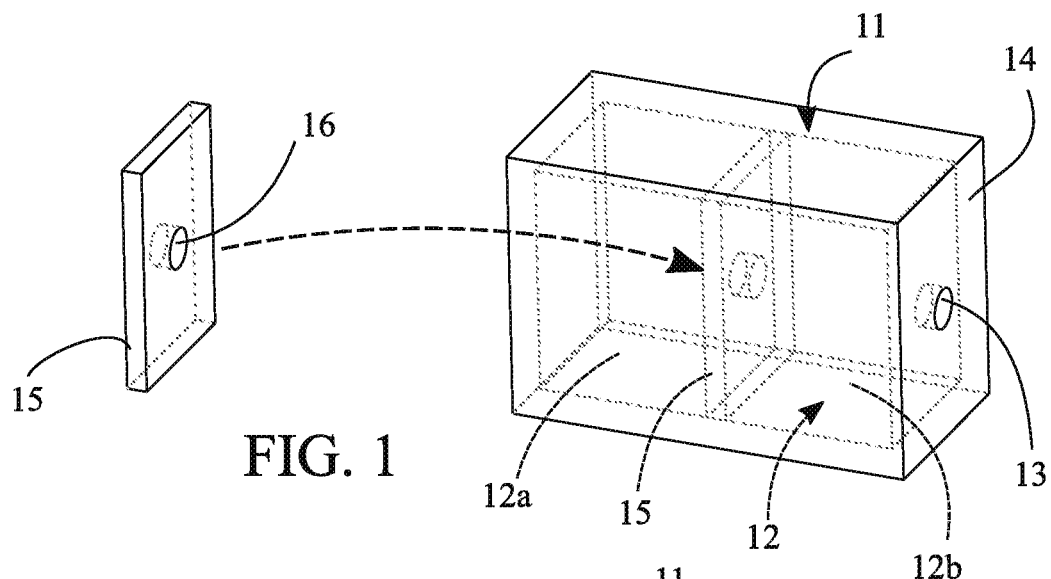
FIG. 1 is an exploded view of an instrument according to the invention in a first production step, showing the insertion of an internal wall into a hollow body of said instrument during a moulding operation.

With reference to the figures, the invention relates to a musical instrument 10 that can have a plurality of purposes, such as those listed in the description of the prior art, however is not limited thereto. The musical instrument 10 is shown in the figures as having a parallelepipedal shape that has been simplified as far as possible, however of course it can have any other three-dimensional shape that is geometrical or otherwise, imaginative or otherwise, or representative of a figurine or otherwise, this shape being defined and chosen as a function of the intended purpose of said instrument. In any case, the musical instrument 10 comprises a hollow and compressible body 11 delimiting at least one closed internal cavity 12. The body 11 of said musical instrument 10 is advantageously made of an elastomer material, such as a natural or synthetic rubber, or any other technically equivalent material, i.e. that has elastic properties that allow the instrument to recover its initial shape after removing a compressive stress. It is preferably made in one piece, and comprises a continuous external wall 14 obtained by moulding as explained hereinbelow. Of course, depending on the complexity of the three-dimensional shape of said instrument, it can be made in two or more pieces assembled along one or more sealing planes that are screwed, welded, bonded or assembled by any other known technical means, such that they can be dismantled or not, as a function of the specifications for said instrument.

The musical instrument 10 advantageously comprises an internal wall 15, the purpose whereof is to divide the internal cavity 12 into two hermetic chambers 12a, 12b and to support a musical insert 20 such that it is arranged inside said body 11, between the two chambers 12a, 12b so as to communicate solely therewith, without any communication with the environment external to said instrument. The internal wall 15 is preferably positioned in a median area of said musical instrument 10 in order to divide the internal cavity 12 into two chambers 12a, 12b of substantially equal volume. This embodiment is preferred however is not the sole possibility since the two chambers could have different volumes without this affecting the operation of said musical insert 20. In such a case, the chamber having the lowest volume should have a sufficient volume to allow a sufficient air flow to be transferred so as to enable the musical insert 20 to emit a sound. Conversely, if the volume of the smallest chamber is insufficient, the air displacement could lead to no sound being generated. More specifically, the volume of these chambers 12*a*, 12*b* defines the air flow that passes through the musical insert 20 to create a sound each time said instrument is stressed. For this purpose, the total air volume of the two chambers 12*a*, 12*b* of the musical instrument 10 in the initial state, i.e. not subjected to mechanical stress, must be determined as a function of the elasticity permitted by the material forming the body 11 of said instrument and the three-dimensional shape of said musical instrument 10. This means that the chambers 12*a*, 12*b* must not be placed under positive pressure in the initial state of said musical instrument 10, because if the total air volume is too high and saturates the chambers, no air displacement can take place between the two chambers 12*a*, 12*b* and thus no sound can be created. Similarly, the chambers 12*a*, 12*b* must not be placed under negative pressure in the initial state of said musical instrument 10, because a too low total air volume will prevent air from being displaced between the two chambers and prevent any sound from being created.

The internal wall 15 further comprises a through-orifice 16 for receiving and holding said musical insert 20 in position, which must, during the mounting thereof, hermetically seal said through-orifice 16 such that the air flow F passes from one chamber to the other exclusively through the musical insert 20 to guarantee optimal operation thereof. This through-orifice 16 is, in the example shown, positioned in the centre of the internal wall 15, allowing the musical insert 20 to be centred relative to said body 11, however this position is not compulsory. Of course the position of the internal wall 15, the number of internal walls 15, the position of the musical insert 20 and the number of musical inserts 20 can vary as a function of the dimensions, shape and intended purpose of the musical instrument 10. A plurality of musical instruments 10, each provided with a different musical insert 20, can conceivably be juxtaposed in a unique device to create a plurality of sound tonalities as a function of the area stressed. The internal wall 15 can be made of a material that is identical or at least chemically compatible with the material of said body 11. It can be made separately so as to then be inserted into the production mould for said body 11 and form one piece with said body 11 after moulding. Of course if the body 11 of the musical instrument 10 is made in two or more pieces assembled along one or more sealing planes, the internal wall 15 can be integrated into a sealing plane between two pieces.

The musical insert 20 is designed to be housed inside the internal cavity 12 of the body 11 and rigidly connected to the internal wall 15 of said instrument without communicating with the external environment. The internal cavity 12 of said body 11 is thus sealingly closed and contains a defined and constant air volume. This air volume remains clean and is free from contaminants since it is never in contact with the external environment when the musical instrument 10 is used. As a result, the musical insert 20 also remains clean since it is confined inside a hermetically-sealed volume, is thus never polluted by contaminants, nor fouled by dust, and the operation thereof is never impaired. The consequence of this design is a musical instrument 10 that offers excellent user safety, since the musical element 20 can never be accessed, even by accident.

The musical insert 20 is designed to emit a sound when an air flow F passes therethrough, obtained as soon as the body 11 of said musical instrument 10 is deformed by mechanical pressure at the level of one of the chambers 12*a*, 12*b* and the air volume contained in this chamber 12*a*, 12*b* on one side of the internal wall 15 is driven towards the other chamber 12*b*, 12*a* on the other side of the internal wall 15 by passing via the musical insert 20 (FIG. 7). For this purpose, the body 11 is advantageously made of a flexible and elastic material, providing said musical instrument 10 with high flexibility, allowing it to be easily deformed by compression and expansion generating the displacement of an air flow F from one chamber 12*a*, 12*b* to the other through said musical insert 20 only, while having the ability to quickly and automatically recover its initial shape as soon as it is no longer stressed. Generally speaking, the musical insert 20 allows a sound to be created in both directions of travel of said air flow F.

Figure 2:
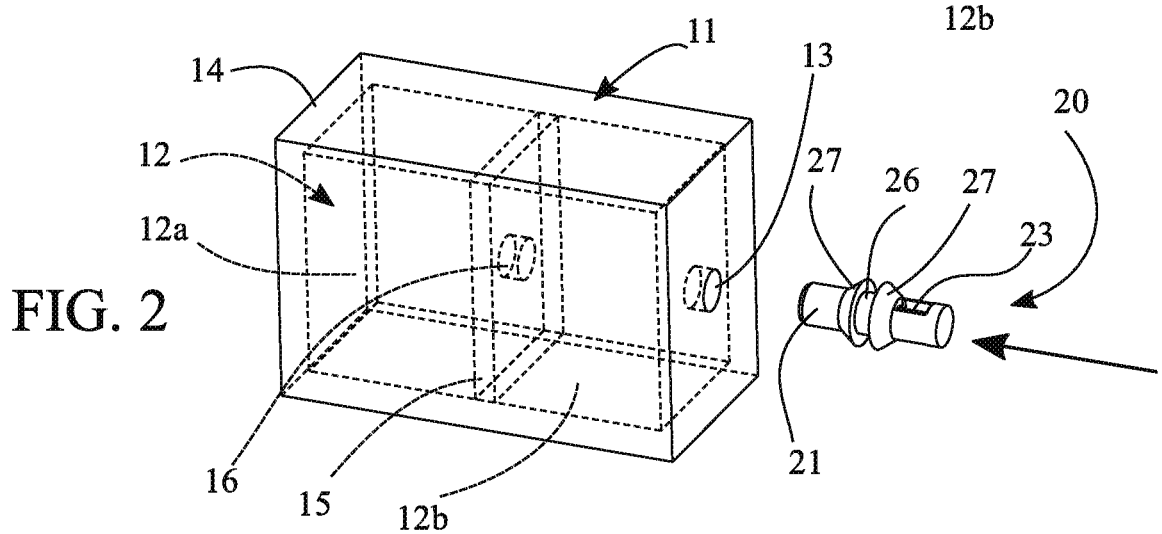
FIG. 2 is an exploded view of the instrument in FIG. 1 in a second production step, showing the mounting of a musical insert inside the body of the instrument obtained by moulding.

The musical insert 20, shown from FIG. 2 onwards, can be formed by any type of commercially-available musical insert, or can be designed especially for the present invention. It comprises a hollow music duct 21 forming an air channel 22 that is open at the two ends thereof by way of an orifice 23 allowing an air flow F to circulate through the duct from end to end. A musical element 30 is mounted inside the air channel 22 so that said air flow F passes therethrough and so as to emit a sound when the body 11 of said musical instrument 10 is deformed and compressed at the level of one of the chambers 12*a*, 12*b*. Of course the musical element 30 and the music duct 21 can be integral with one another, or can form two separate pieces assembled together in a locked mounting position.

The musical insert 20 comprises an assembly area 25, which can be median or otherwise, simultaneously allowing the axial interlocking thereof in the through-orifice 16 of the internal wall 15, the axial locking thereof in both directions relative to this wall and the sealing of said through-orifice 16. This mounting area 25 comprises, for this purpose, a groove 26 capable of receiving the thickness of said internal wall 15, and two lips 27 arranged on either side of said groove 26 so as to, on the one hand, lock the axial position of the musical insert 20 in both directions relative to the internal wall 15, and on the other hand, ensure the airtightness of this assembly. In the example shown, the music duct 21 is cylindrical and the mounting area 25 is annular. Thus, the internal diameter of the groove 26 must be substantially equal to, or slightly greater than the diameter of the through-orifice 16 in order to ensure tight mounting. Similarly, the width of the groove 26 must be substantially equal to or slightly less than the thickness of the internal wall 15 so as to press, under pressure, the lips 27 against the two opposite faces of said wall. Moreover, the external diameter of the lips 27 must be greater than the diameter of the through-orifice 16 in order to contribute to the airtightness of this assembly. Of course any other equivalent technical means can be suitable. Similarly, the cylindrical shape of the music duct 21 and the annular shape of the mounting area 25 are not limiting and can be different while ensuring the intended functions.

The musical element 30 contained in the musical insert 20 is a small wind instrument. In the example shown, it is formed by a dual-inlet whistle, wherein the sound is created by the vibration of a reed during the passage of an air flow F circulating in the two opposite directions depending on whether one or the other chamber 12a, 12b is compressed. It forms a part of the known elements and will not be described in more detail. It can be made of wood, reed, metal, a synthetic material such as a thermoplastic material, a composite material, or a combination of at least two of these materials. Of course any other musical element shape and/or design can be suitable.

INDUSTRIAL APPLICABILITY

The method for producing the musical instrument 10 according to the invention comprises an operation for moulding the body 11 of the instrument in a hollow production mould (not shown), the internal surface whereof corresponds to the three-dimensional impression of said instrument. A rotational moulding technique or a moulding by rotation of production mould can be chosen, which allows hollow parts to be produced in one piece, without any sealing plane, by shaping a molten plastic material against the internal wall of a hollow production mould. A two-component injection technique can also be used with a step of bonding the two components on a press along a sealing plane. A blowing technique can also be used if the plastic material used is compatible therewith. In the present invention, the main plastic materials that can be used are formed by an elastomer such as a natural or synthetic rubber, however this example is not limiting. The production mould is generally made in two parts, however this example is not limiting, and is equipped with one or more vents ensuring the pressure balance inside the mould. A dose of plastic materials is loaded into the mould before being closed, which dose is defined as a function of the thickness of the wall 14 of said instrument to be produced. The moulding phase comprises a heating step and a cooling step. The vent allows the gases contained in the mould to escape outside the mould during the heating step, then allows air to enter the mould during the cooling step, thus preventing the part from being under negative pressure.

Prior to the step of moulding the body 11 of said instrument, the internal wall 15, produced separately, is added to the interior of the mould, for example between the two parts of the mould. In such a case, the vent provided in the mould can be extended as far as the interior of the through-orifice 16 of the internal wall 15 to prevent this orifice from becoming blocked by the molten plastic material. Thus, at the end of the moulding phase, and after opening the mould, the body 11 of said instrument is obtained, according to FIG. 1, integrating the internal wall 15, the periphery whereof is closely connected to the external wall 14 of the body 11 by fusion between the two materials during the moulding operation. This is why the internal wall 15 and the body 11 of said instrument are made from a similar, identical or compatible elastomer material.

Figure 3:
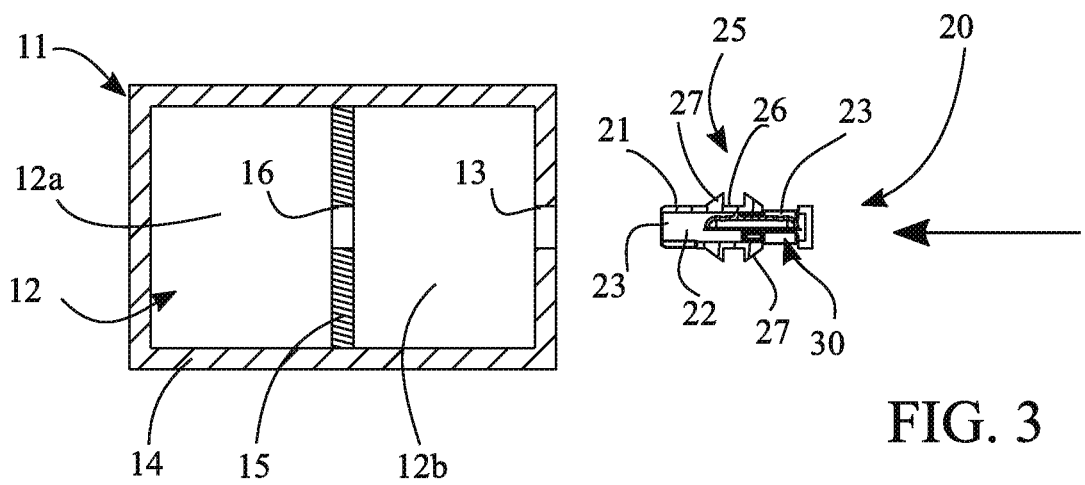
FIG. 3 is an axial sectional view of the instrument in FIG. 2.

After the maturing or complete drying phase for said body 11, the musical insert 20 is inserted into the interior of the body 11 via the vent hole 13 left in the external wall 14 of said body 11 by the vent of the production mould, as shown in FIGS. 2 and 3. Since the material forming the body 11 is flexible and elastic, the musical insert 20 can pass through the vent hole 13 which expands during the passage of the music duct 21 and the lips 27. The musical insert 20 is guided inside the body 11 to interlock with the internal wall 15 through the through-orifice 16. The material forming the internal wall 15 and/or the music duct 21 allow the through-orifice 16 and/or the lips 27 to deform during the passage of the music duct 21 and of one of the lips 27. After mounting the musical insert 20 inside the body 11, as shown in FIG. 4, a plug 17 is inserted into the vent hold 13 in order to close same in an airtight manner. In the example shown, this plug 17 has a shoulder and is rigidly connected to the wall 14 by bonding or any other equivalent method allowing the internal cavity 12 to be hermetically sealed. Similarly, any other type of plug fulfilling the same function can be suitable, such as a gasket made of an elastomer material or latex created by material accumulation in the vent hole 13, or a disc made of an elastomer material superimposed over the vent hole 13 and sealed with latex, etc. As a result, the term "plug" must not be interpreted in a restrictive manner.

The musical instrument 10 obtained by the production method according to the invention is shown in FIGS. 5 to 7. It constitutes an instrument that is completely airtight, containing, in the internal cavity 12 thereof, a determined and constant air volume (symbolised in FIG. 5 by an equal density of points between the two chambers). This air volume can be at atmospheric pressure or at a pressure that is slightly greater than or slightly less than atmospheric pressure, determined empirically as a function of the elasticity of the material used to form said body 11 and the three-dimensional shape of said body 11. In the example shown, this air volume is divided into two substantially equal parts in the two chambers 12a, 12b separated from one another in a sealed manner by the internal wall 15, through which said musical insert 20 is positioned. As specified hereinabove, the two chambers 12a, 12b can have different volumes. The position of equilibrium of the musical instrument 10 is shown in FIG. 5, in which position the instrument does not emit any sound. This position of equilibrium corresponds to the initial state of said musical instrument 10, i.e. when it is not subjected to any mechanical stress. In order to create a sound, a mechanical pressure must be exerted on the body 11 of said musical instrument 10 at the level of one of the chambers 12b, shown by the arrows P in FIG. 7, which will drive a part of the air volume from this chamber 12b into the other chamber 12a in order to create an air flow F in one direction through the musical insert 20, generating a sound. The air volume driven by one of the chambers 12b will place this chamber 12b under negative pressure (symbolised by a density of points that is greater than the density of the position of equilibrium in FIG. 5) and the other chamber 12a under positive pressure (symbolised by a density of points that is less than the density of the position of equilibrium in FIG. 5), increasing the air volume to an equal degree and causing the expansion of the body 11 at the level of this other chamber 12a represented by the arrows E. This position of non-equilibrium is shown in FIG. 7. Conversely, a mechanical pressure (not shown) exerted on the body 11 at the level of the other chamber 12a drives a part of the air volume from this chamber 12a into the other chamber 12b, creating an air flow F in the other direction through the musical insert 20 also generating a sound. The release of the compressive stresses on the musical instrument 10 results in an automatic rebalancing of the pressures between the two chambers 12a, 12b via the musical insert 20 which may or may not generate a sound depending on the sensitivity thereof. The musical instrument 10 automatically resumes the position of equilibrium thereof or the initial state thereof (FIG. 5) and stops emitting sound.

It is clear from the above that the invention achieves the goals set. In particular, this musical instrument 10 can emit sounds without being in communication with the external environment, by a simple air transfer between two hermetically-sealed chambers 12a, 12b via a musical insert 20. As a result, this musical instrument 10 is said to be "clean", given that the internal volume thereof and the musical insert 20 thereof are protected from the user and from the external environment by the hermetically-sealed body 11 thereof, preventing any contamination risk. Moreover, it can be easily washed, cleaned or disinfected to further prevent any risk of contamination by touch. This musical instrument 10 can be suited to any type of application, either in the emergency sector as an audible alarm, in the sports sector as a refereeing means, in the leisure sector as a musical instrument, or in the games sector as a squeaky or whistling toy for children and pets, etc. The specific design thereof ensures that this musical instrument 10 is a perfectly safe device for the user since the musical insert 20 cannot be accessed, even accidentally.

The present invention is not limited to the example embodiment described herein, but encompasses all amendments and alternatives that are clear to a person skilled in the art.

The invention claimed is:

1. A method for producing a musical instrument, said musical instrument comprising a hollow and compressible body made of a flexible and elastic material, delimiting an internal cavity, an internal wall arranged inside said body in order to divide said internal cavity into two chambers, and a musical insert mounted through said internal wall in order to place said chambers in communication with one another and designed to emit a sound when passed through by an air flow, said air flow being generated by a mechanical pressure exerted on said body at the level of one of the chambers, in which method the body of said musical instrument is made, using a moulding technique, from an elastomer material shaped in a hollow production mould provided with a vent hole, the internal volume of said mould corresponding to the three-dimensional impression of said body, wherein said internal wall provided with a through-orifice designed to receive and hold said musical insert in position is produced separately, and wherein, prior to the step of moulding said body, said internal wall is added into said production mould such that the periphery thereof is overmoulded by said body during the moulding step, and wherein, after the moulding operation for said body, said musical insert is inserted into said body via the vent hole left in the external wall of said body by the vent of said production mould, in order to interlock same in the internal wall through said through-orifice and simultaneously hermetically seal said through-orifice, and wherein, after mounting the musical insert inside said body, said vent hole is closed by a plug in order to sealingly plug and hermetically seal said internal cavity, such that said musical insert is arranged inside said body, between the two chambers so as to communicate solely therewith, without any communication with the environment external to said musical instrument.

2. A method according to claim 1, wherein said internal cavity is filled with a determined and constant total air volume taking into account the elasticity of said material forming said body and the three-dimensional shape of said body in order to allow air to be displaced between the two chambers when a mechanical pressure is exerted on said body at the level of one of the chambers and thus allow a sound to be created each time said instrument is mechanically stressed.

3. A method according to claim 1, wherein said moulding technique is a rotational moulding technique.

4. A method according to claim 1, wherein the internal wall and the body of said musical instrument are made of a similar, identical or compatible elastomer material, allowing the two materials to fuse during the moulding operation.

5. A method according to claim 4, wherein said elastomer material is chosen from natural rubbers, synthetic rubbers and thermoplastic elastomers.

6. A method according to claim 1, wherein a mounting area complementary to the through-orifice provided in said internal wall is provided on said musical insert and designed to hermetically seal said through-orifice.

7. A method according to claim 6, wherein said mounting area is produced in the form of a groove designed to receive said through-orifice, and two lips arranged on either side of said groove and designed to be pressed against the opposite faces of said internal wall, to hold said musical insert in the mounting position relative to said internal wall and to hermetically seal said through-orifice.

8. A musical instrument obtained by the production method according to claim 1, said musical instrument comprising said hollow and compressible body made of said flexible and elastic material, delimiting said internal cavity, said internal wall arranged inside said body in order to divide said internal cavity into two chambers, and said musical insert mounted through said internal wall in order to place said chambers in communication with one another and designed to emit said sound when passed through by said air flow, said air flow being generated by said mechanical pressure exerted on said body at the level of one of the chambers, wherein said internal wall has its periphery overmoulded by said body and comprises said through-orifice designed to receive and hold said musical insert in position, and wherein said musical insert is designed to hermetically seal said through-orifice, and wherein said body comprises said vent hole that is hermetically sealed by said plug such that said musical insert is arranged inside said body, between the two chambers so as to communicate solely therewith, without any communication with the environment external to said musical instrument.

9. A musical instrument according to claim 8, wherein said internal cavity is filled with a determined and constant total air volume taking into account the elasticity of said material forming said body and the three-dimensional shape of said body in order to allow air to be displaced between the two chambers when a mechanical pressure is exerted on said body at the level of one of the chambers and thus allow a sound to be created each time said instrument is mechanically stressed.

10. A musical instrument according to claim 8, wherein said musical insert comprises a mounting area complementary to the through-orifice provided in said internal wall and designed to hermetically seal said orifice.

11. A musical instrument according to claim 10, wherein said mounting area comprises a designed to receive said through-orifice, and two lips arranged on either side of said groove and designed to be pressed against the opposite faces of said internal wall, to hold said musical insert in the mounting position relative to said internal wall and to hermetically seal said through-orifice.

* * * * *

UNITED STATES PATENT AND TRADEMARK OFFICE
CERTIFICATE OF CORRECTION

PATENT NO. : 11,676,566 B2
APPLICATION NO. : 16/763093
DATED : June 13, 2023
INVENTOR(S) : Bao Han On It is certified that error appears in the above-identified patent and that said Letters Patent is hereby corrected as shown below:

In the Claims

At Column 10, Line 56, "a designed" should be -- a groove designed --.

Signed and Sealed this
Sixteenth Day of January, 2024

Katherine Kelly Vidal
*Director of the United States Patent and Trademark Office*